United States Patent [19]

Sakakibara

[11] Patent Number: 4,549,447
[45] Date of Patent: Oct. 29, 1985

[54] BELT DRIVE CONTINUOUSLY-VARIABLE SPEED AUTOMATIC TRANSMISSION

[75] Inventor: Shiro Sakakibara, Toyokawa, Japan

[73] Assignee: Aisin Warner Kabushiki Kaisha, Aichi, Japan

[21] Appl. No.: 342,637

[22] Filed: Jan. 26, 1982

[30] Foreign Application Priority Data

Feb. 2, 1981 [JP] Japan .................. 56-13996

[51] Int. Cl.⁴ .................. F16H 37/00; F16H 37/08
[52] U.S. Cl. .................. 74/689; 74/695; 74/694
[58] Field of Search .......... 474/8, 18, 28, 29, 72, 474/148; 74/689, 740, 730, 694, 695

[56] References Cited

U.S. PATENT DOCUMENTS

| | | |
|---|---|---|
| 3,146,633 | 9/1964 | Schmitter et al. .......... 474/28 |
| 3,340,749 | 9/1967 | Magg et al. .............. 74/689 |
| 3,505,904 | 4/1970 | Williams, Jr. ............ 74/694 |
| 3,939,732 | 2/1976 | Giacosa .................. 74/740 |
| 4,060,012 | 11/1977 | Giacosa ................. 74/689 |
| 4,317,389 | 3/1982 | Falzoni .................. 74/694 |
| 4,342,238 | 8/1982 | Gardner .................. 74/740 |
| 4,346,622 | 8/1982 | Pierce ................... 74/740 |
| 4,393,731 | 7/1983 | Croswhite et al. ......... 74/730 |
| 4,455,888 | 6/1984 | Wayman et al. ............ 74/689 |

FOREIGN PATENT DOCUMENTS

0100455   7/1980   Japan .................. 474/8

*Primary Examiner*—George H. Krizmanich
*Assistant Examiner*—Dirk Wright
*Attorney, Agent, or Firm*—Blum Kaplan Friedman Silberman & Beran

[57] ABSTRACT

A belt drive continuously-variable speed automatic transmission for motor vehicles, comprises a torque converter, forward/reverse rotation changeover mechanism, a belt drive continuously-variable speed transmission means and a differential gear disposed in a single housing in an integrated unit.

The belt drive continuously-variable speed transmission means comprises a primary variable-pitch pulley mounted on the intermediate shaft, a secondary variable-pitch pulley mounted on an output shaft rotatably supported on the housing in parallel to the intermediate shaft and an endless belt interconnecting the primary and the secondary variable-pitch pulleys.

6 Claims, 3 Drawing Figures

BELT DRIVE CONTINUOUSLY-VARIABLE SPEED AUTOMATIC TRANSMISSION

BACKGROUND OF THE INVENTION

This invention relates generally to an automatic transmission for a motor vehicle and more particularly to a belt drive continuously-variable speed automatic transmission for a motor vehicle. A belt drive continuously-variable speed automatic transmission comprises two variable-pitch pulleys and a belt which is V-shaped or trapezoidal in cross-section, extended between the two variable pitch pulleys. The belt drive continuously-variable speed automatic transmission is adapted to vary continuously the ratio between the rotational speeds of the shafts of the two variable pitch pulleys.

The belt drive continuously-variable speed automatic transmission is simpler in construction and smaller in size when compared with a corresponding gear transmission. However, the belt drive continuously-variable speed automatic transmission does require an additional gear mechanism for providing reverse rotation so as to be suitable for application as a transmission in a motor vehicle. Also, the belt drive continously-variable speed automatic transmission required a greater reduction ratio between the output shaft and the driving axle as compared with a gear type transmission because an increased reduction ratio is impracticable when the diameters of the pulleys must be designed within a limited range.

What is needed is a belt drive continuously-variable speed automatic transmission suitable for assembling an engine, transmission and a differential gear in an integral compact unit.

SUMMARY OF THE INVENTION

Generally speaking, in accordance with the invention, a belt drive continuously-variable speed automatic transmission especially suitable for use in a motor vehicle is provided. The belt drive continuously-variable speed automatic transmission comprises a fluid coupling, an input shaft and an intermediate shaft rotatably supported on the housing and extending coaxially with the input shaft. The automatic transmission also comprises an output shaft rotatably supported on the housing and parallel with the intermediate shaft, a forward/reverse rotation changeover mechanism interposed between the input shaft and the intermediate shaft, a belt drive continuously-variable speed transmission means for transmitting the rotation of the intermediate shaft to the output shaft continuously and steplessly, a differential gear box including the right and left driving axles, and differential gear wheels associated with the axles disposed in the housing. Also included is a chain interconnecting the output shaft with the differential gear box.

The forward/reverse rotational changeover mechanism comprises a clutch for directly coupling the intermediate shaft to the input shaft for rotating the intermediate shaft in the same direction with that of the input shaft and a gear mechanism for rotating the intermediate shaft in a direction opposite to that of the input shaft.

The belt drive continuously-variable speed automatic transmission comprises a primary variable pitch pulley having a fixed pulley flange fixed to and concentric with the intermediate shaft, and a movable pulley shaft mounted coaxially and slidably on the intermediate shaft. The belt drive continuously-variable speed automatic transmission also includes a secondary variable pitch pulley having a fixed pulley flange fixed to and concentric with the output shaft, and a movable pulley flange mounted coaxially and slidably on the output shaft. Further included is an endless belt extended between the primary variable pitch pulley and the secondary variable pitch pulley.

Accordingly, it is an object of this invention to provide an improved belt drive continuously-variable speed automatic transmission constructed by integrating a fluid coupling or a torque converter, a belt drive continuously-variable speed automatic transmission means, and differential gear box including the right and left driving axles of the vehicles into an integral unit within a housing.

Another object of this invention is to provide an improved belt drive continuously-variable speed automatic transmission which is compact in size.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is has to the following description taken in connection with the accompanying drawings, in which.

DESCRIPTION OF THE PREFERRED EMBODIMENTS

Figure 1:
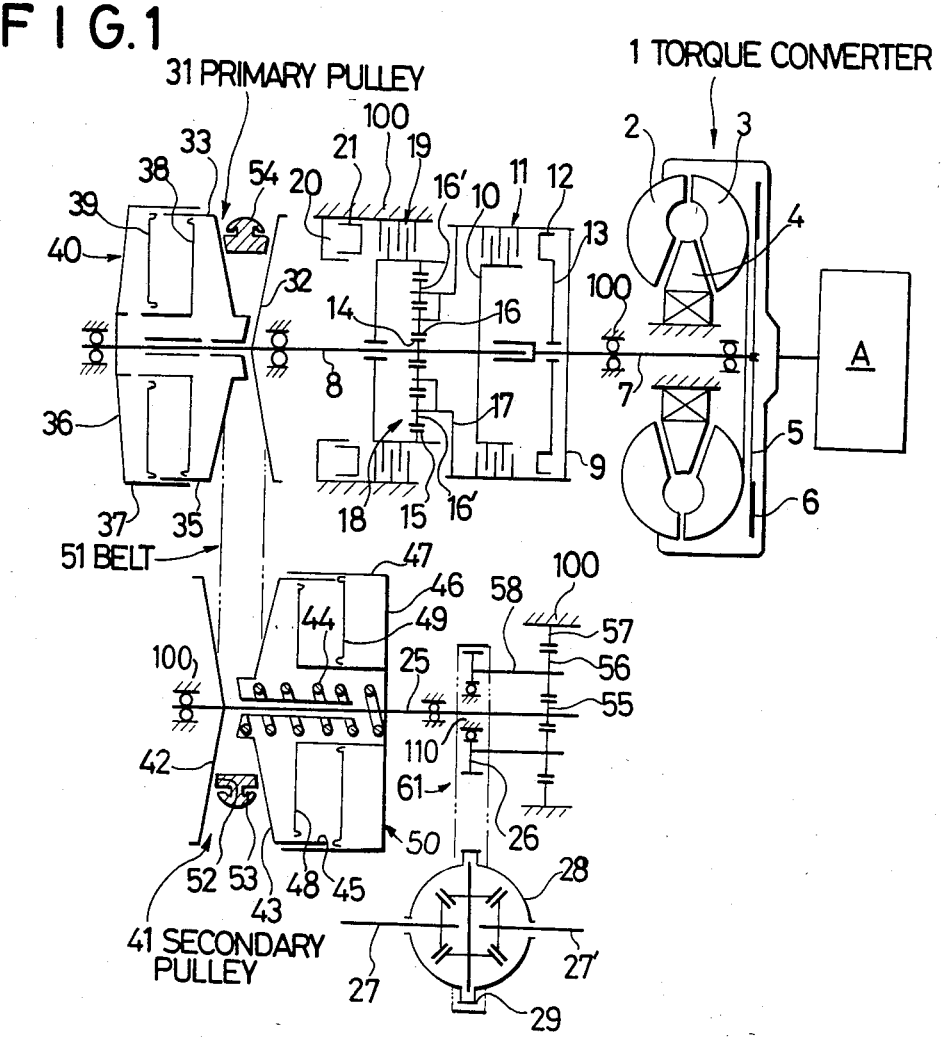
FIG. 1 is a schematic of a belt drive continuously-variable speed automatic transmission for a motor vehicle in accordance with the invention.
Figure 2:
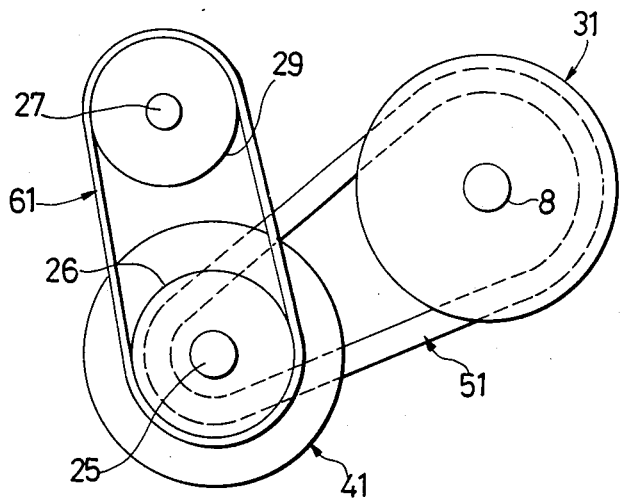
FIG. 2 is a schematic of a power transmitting mechanism between a primary pulley, a secondary pulley and a differential gear box of FIG. 1.

With reference to the Figures, a torque converter 1 comprises a pump impeller 2 connected to the output shaft of a prime mover A, for example, an internal combustion engine. The torque converter 1 further comprises a turbine runner 3 connected to an input shaft 7 which is described hereinafter, a stator 4 supported on a housing 100 through a one-way clutch, and a piston 5 mounted slidably on the turbine runner 3 or on the input shaft 7 and provided with a friction plate 6 on the surface thereof facing the casing of the torque converter fixedly joined to the pump impeller 2. The piston 5 and the casing form a direct coupling clutch.

The input shaft 7 of the transmission is supported rotatably on the housing 100. One end of the input shaft 7 connects to the turbine runner 3 while the other end thereof rotatably supports one end of an intermediate shaft 8 which is coaxial with the input shaft 7. The intermediate shaft 8 is supported at the other end thereof on the housing 100. A clutch drum 9 is fixed coaxially to the other end of the input shaft 7. A clutch hub 10 is connected coaxially to one end of the intermediate shaft 8 adjacent to the input shaft 7. A multiple disc clutch 11 is formed between the respective cylindrical members of the clutch drum 9 and the clutch hub 10. The multiple disc clutch 11 operates by the action of a piston 12 mounted slidably on the clutch drums so that the input shaft 7 and the intermediate shaft 8 are connected or disconnected from each other. A cylinder 13 actuates the piston 12.

A planetary gear 18 mounts on the intermediate shaft 8. The planetary gear 18 includes a sun gear 14 splined to the intermediate shaft 8, a ring gear 15 mounted coaxially and rotatably on the intermediate shaft 8, planetary pinions 16 engaging with the sun gear 14, planetary pinions 16' engaging with the ring gear 15, and a planetary carrier 17 carrying rotatably the planetary pinions 16,16'.

The planetary carrier 17 is splined to the clutch drum 9 around the periphery thereof. A multiple disc brake 19 is formed between the periphery of the ring gear 15 and the cylindrical surface of the housing 100. The multiple disc brake 19 operates by means of a piston 21 adapted to slide within a cylinder 20 formed on the housing 100 so as to engage or to release the ring gear 15 with respect to the housing 100. When the ring gear 15 engages the housing 100, rotation of the input shaft 7 is transmitted to the intermediate shaft 8 in the reverse rotational direction.

The multiple disc clutch 11, planetary gear 18 and multiple disc brake 19 constitute a forward/reverse changeover mechanism between the input shaft 7 and the intermediate shaft 8.

A fixed pulley flange 32 of a primary variable pitch pulley 31 is formed integrally and coaxially with the intermediate shaft 8. A movable pulley flange 33 mounts slidably along the axis of the intermediate shaft 8 on the intermediate shaft 8 opposite to the coaxially with the fixed pulley flange 32. A double piston hydraulic servomechanism 40 is constructed by arranging a cylindrical wall 35 of the movable flange 33 coaxially with the peripheral wall 37 of a cylinder head 36 fixed to the intermediate shaft 8, and by providing a first piston 38 which is mounted slidably on the intermediate shaft 8 at the inner circumference thereof and fitted in the cylindrical wall 35. Also, a second piston 39 is fitted in the peripheral wall 37 of the cylinder 36 and opposite to the first piston 38.

A fixed pulley flange 42 of a secondary variable pitch pulley 41 is formed integrally and coaxially with the output shaft 25, which output shaft 25 is supported on the housing 100 and parallel with the intermediate shaft 8. A movable pulley flange 43 mounts on the output shaft 25 concentrically and slidably in the axial direction and opposite to the fixed pulley flange 42. A double piston hydraulic servomechanism 50 is constructed by arranging a cylindrical wall 45 of the movable pulley flange 43 concentrically with a peripheral wall 47 of a cylinder 46 fixed to the output shaft 25, and by providing a first piston 48 which is fitted in the cylindrical wall 45 and a second piston 49 fitted in the peripheral wall 47 of the cylinder and arranged opposite to the first piston 48. A helical spring 44 within the cylinder 46 urges the movable pulley flange 43 toward the fixed pulley flange 42.

An endless belt 51 extends between the primary variable pitch pulley 31 of the secondary variable pitch pulley 41 by fitting in the grooves formed between the respective conical surfaces of the opposite pulley flanges. The endless belt 51 is of a known type disclosed in the Japanese Laid-Open Official Gazette for patent application No. 52253/1979, and is constructed by arranging a number of metal blocks 54 each having inclined surfaces 52, for engaging with the conical surfaces on both sides and having slits 53 opening in the inclined surfaces 52. The metal blocks 54 are linked with an endless metal band by fitting the metal band in the slits 53. The primary variable pitch pulley 31, the secondary variable pitch pulley 41 and the endless belt 51 constitute a belt drive continuously-variable speed automatic transmission means.

A sprocket wheel 25 may be directly fixed to the output shaft 25. A differential gear box 28 containing a differential gear including driving axles 27,27' for transmitting power to the right and left driving wheels, and including beveled gears fixed to the driving axles 27,27', is supported rotatably on the housing 100 with the driving axles 27,27' positioned in parallel to the output shaft 25.

A chain 61 extends between a sprocket wheel 29 attached to the periphery of the differential gear box 28 and to the sprocket 26 to transmit rotation of the output shaft 25 to the driving axles 27,27'. The sprocket wheel 26 may be fixed directly to the output shaft 25, however, in the embodiment illustrated in the drawings, the sprocket wheel 26 is mounted on supporting member 110 fixedly supported on the housing 100 so as to rotate concentrically and relatively to the output shaft 25. The sprocket wheel 26 is connected to a planetary carrier 58 so that rotation of the output shaft 25 is transmitted to the sprocket wheel 26 after being reduced in velocity by the function of a reduction gear comprising a sun gear 55 fixed to the output shaft 25, planetary pinions 56 engaging with the sun gear 55, a ring gear 57 engaging the planetary pinions 56 and fixed to the housing 100 in concentricity with the sun gear 55. A planetary carrier 58 rotatably carries the planetary pinions 56.

Figure 3:
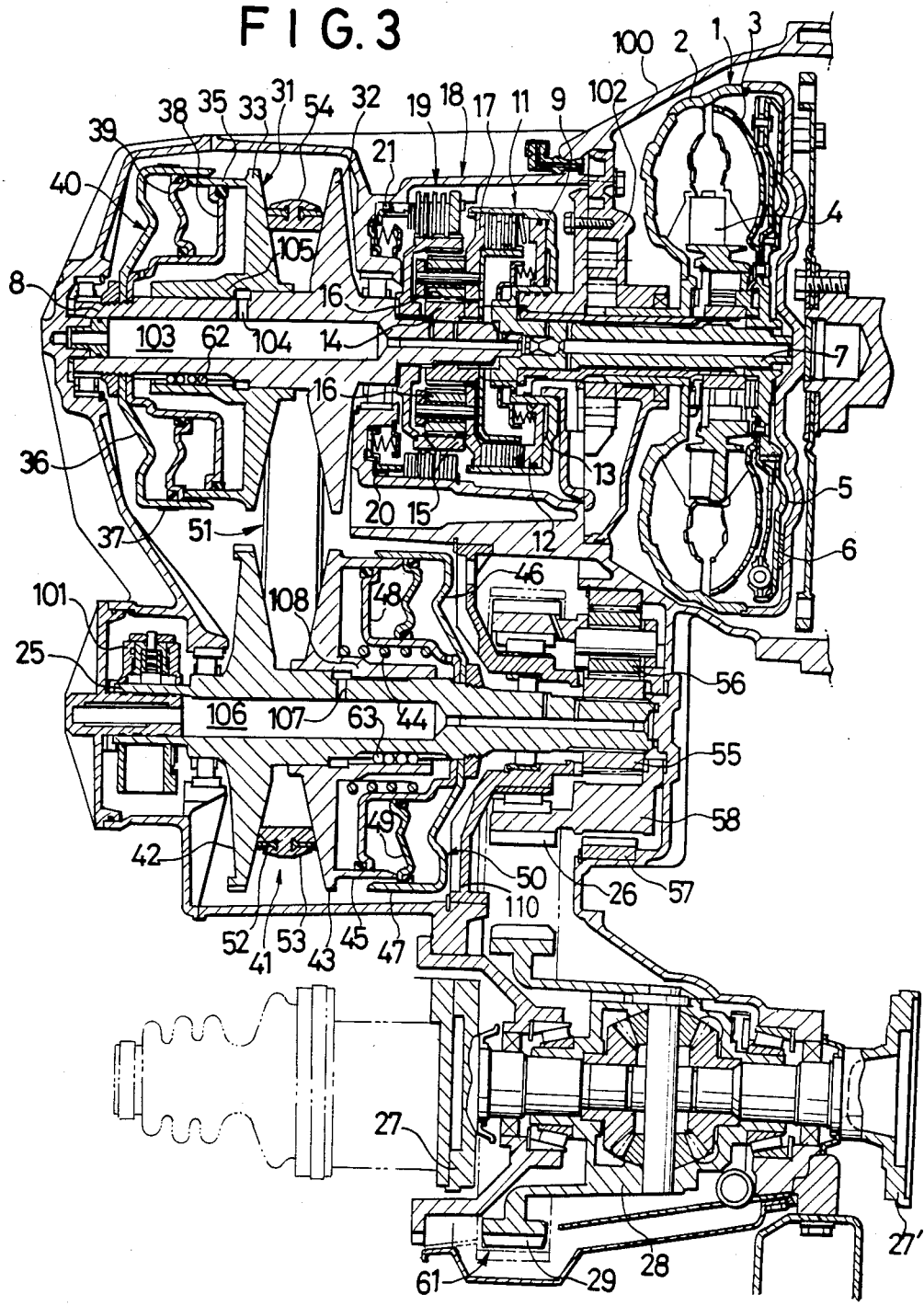
FIG. 3 is a sectional view of a belt drive continously-variable speed automatic transmission for a motor vehicle in accordance with the invention.

A plurality of spherical members 62, (FIG. 3) are retained in axial grooves formed oppositely on the outside surface of the intermediate shaft 8 and on the wall of the bore of the movable pulley flange 33 of the primary variable pitch pulley 31. A plurality of spherical members 63 are retained also in the axial grooves formed oppositely on the outside surface of the output shaft 25 and on the wall of the bore of the movable pulley flange 43 of the secondary variable pitch pulley 41. The movable flanges 33,43 are able to rotate together with the intermediate shaft 8 and the output shaft 25 respectively as well as to slide axially under reduced sliding resistance.

A governor valve 101 provided on one end of the output shaft 25 operates to apply a factor of the rotational speed of the output shaft 25, namely, a factor proportional to the vehicle speed, to the fluid pressure generated by an oil pump 102.

In the operation of the mechanism thus constructed in accordance with the invention, with a manual selector valve (not shown) at a forward position, a line pressure controlled with a throttle valve (not shown) and the governor valve 101 is applied to the cylinder 13 so that the multiple disc clutch 11 engages to connect the input shaft 7 and the intermediate shaft 8. The line pressure is further applied to the cylinder chamber of the hydraulic servomechanism 40 by way of the bore opening 103, a through hole 104 formed on the intermediate shaft 8 and a through hole 105 formed on the boss of the movable pulley flange 33. At the same time, the line pressure is applied to the cylinder chamber of the hydraulic servomechanism 50 by way of the bore 106, a through hole 107 formed on the output shaft 25, and a through hole 108 formed on the boss of the movable pulley flange 43.

Then, the respective movable pulley flanges 33,43 of the primary variable pitch pulley 31 and the secondary variable pitch pulley 41 shift toward the fixed pulley flanges 32,42 respectively, so that the endless belt 51 presses between the movable pulley flanges and the fixed pulley flanges with the inclined surfaces 52 in contact with the conical surfaces of the pulley flanges. Thereby, the rotation of the intermediate shaft 8 is transmitted to the input shaft 25 through the endless belt 51.

When force, depending on the pressure of the working fluid applied to the hydraulic servomechanism 40 for controlling the primary variable pitch pulley 31, is increased over the force depending on the pressure of the working fluid applied to the hydraulic servomechanism 50 for controlling the secondary variable pitch pulley 41, the working radius of the primary variable pitch pulley 31 gradually increases. At the same time, the working radius of the secondary variable pitch pulley 41 gradually decreases so that the belt drive continuously-variable speed transmission means makes the rotational speed of the output shaft increase continuously and steplessly. Rotation of the output shaft 25 is transmitted to the sprocket wheel 26 through the reduction gear comprising the sun gear 55, planetary pinions 56, planetary carrier 58, and a ring gear 57. Power is transmitted at a preselected reduction ratio. Rotation of the sprocket wheel 26 is transmitted to the right and left driving axles 27,27' through the chain 61, sprocket wheel 29 and the differential gear box 28.

With the manual selector valve at the reverse position, line pressure is applied to the cylinder 20 so that the piston 21 operates the multiple disc clutch 19 to have the ring gear 16 engage with the housing 100. Thereby, the intermediate shaft 8 is turned in the reverse direction relative to the rotational direction of the input shaft 7 at a predetermined reduction ratio through the planetary gear 18. Line pressure is applied to the respective hydraulic servomechanisms 40,50 for controlling the primary variable pitch pulley 31 and the secondary variable pitch pulley 41 in the same procedure as described hereinbefore so that driving axles 27,27' rotate in the reverse direction.

With the manual selector valve at the neutral position, the line pressure applied to the cylinders 13,20 and the hydraulic servomechanism 40 is drained. Consequently, the helical spring 44 provided within the hydraulic servomechanism 50 for controlling the secondary variable pitch pulley 41, pushes the movable pulley flange 43 closer to the fixed pulley flange 42 so that the endless belt 51 is pushed radially outward. Thereby, the reduction ratio of rotational speed of the output shaft 25 against the rotational speed of the intermediate shaft 8 is held at the maximum reduction ratio while the vehicle is at a standstill.

Because the output shaft 25 and the driving axles 27,27' are disposed in parallel to each other, and power is transmitted with a chain from the output shaft 25 to the driving axles 27,27', the reduction ratio between the output shaft 25 and the driving axles 27,27' is determined with more freedom of choice as compared with transmission of power from the output shaft 25 to the driving axles 27,27' by means of a gear train. Power transmission distance is reduced, weight of the transmission mechanism is reduced, working fluid is supplied to the hydraulic servomechanism 50 for controlling the secondary variable pitch pulley 41 from an end of the output shaft 25, and increased freedom is provided for designing the location of the intermediate shaft 8, the output shaft 25 and the driving axles 27,27'.

Furthermore, it is apparent that an optional fluid coupling other than a torque converter as shown in the Figures can be used as the belt drive continuously-variable speed automatic transmission in accordance with the invention.

The belt drive continuously-variable speed automatic transmission in accordance with the invention is greatly advantageous as a automatic transmission for a vehicle.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A belt drive continuously-variable speed automatic transmission for a motor vehicle, comprising:
   a housing;
   a fluid coupling supported on said housing;
   an input shaft connected to the output side of said fluid coupling and rotatably supported on said housing;
   an intermediate shaft rotatably supported on said housing coaxially with said input shaft and rotatable relative to said input shaft;
   means for transmitting motion of said input shaft to said intermediate shaft;
   an output shaft rotatably supported on said housing in parallel with said intermediate shaft;
   a belt drive continuously-variable speed transmission means including a primary variable-pitch pulley having a fixed pulley flange fixed concentrically to said intermediate shaft and a movable pulley flange axially slidable relative to said fixed pulley flange, a secondary variable-pitch pulley having a fixed pulley flange fixed concentrically to said output shaft and a movable pulley flange axially slidable relative to said fixed pulley flange, and a belt extended between said primary variable-pitch pulley and said secondary variable-pitch pulley for transmitting the rotation of said intermediate shaft to said output shaft at a continuously-variable ratio of rotational speed between said intermediate shaft and said output shaft by varying the working radial position of said belt on said primary and secondary variable-pitch pulleys;
   differential gear means including a differential gear box, the right and left driving axles and differential gear wheels associated with the driving axles being rotatably supported on said housing with the driving axles arranged in parallel with said output shaft;
   a first sprocket wheel rotatably mounted on said housing coaxially with said output shaft and in a plane perpendicular to the axis of rotation of said output shaft;
   reduction gear means provided on said output shaft and having an input end thereof connected to said output shaft and an output end thereof connected to said first sprocket wheel, said first sprocket wheel being located between said secondary variable-pitch pulley and said reduction gear means;

a second sprocket wheel fixed to said differential gear box in a plane perpendicular to the axis of rotation of said differential gear box; and a chain extended between said first and second sprocket wheels to transmit the rotation of said first sprocket wheel to said second sprocket wheel.

2. A belt drive continuously-variable speed automatic transmission for a motor vehicle as claimed in claim 1, wherein said means for transmitting motion of said input shaft to said intermediate shaft includes a forward-/reverse rotation changeover mechanism interposed between said input shaft and said intermediate shaft and including a clutch for directly coupling said intermediate shaft to said input shaft to rotate said intermediate shaft in the same direction of rotation as said input shaft and a gear mechanism for rotating said intermediate shaft in a direction opposite to the direction of rotation of said input shaft.

3. A belt drive continuously-variable speed automatic transmission of a motor vehicle as claimed in claim 2, wherein said forward/reverse rotation changeover mechanism is interposed between said fluid coupling and said primary variable-pitch pulley of said belt drive continuously-variable speed transmission means and includes a sun gear fixed to said intermediate shaft, a ring gear mounted coaxially on said intermediate shaft, at least one first planetary pinion engaging with said sun gear, at least one second planetary pinion engaging with said ring gear, a planetary carrier carrying rotatably said at least one first and at least one second planetary pinion, a clutch formed between said input shaft and said intermediate shaft and a brake formed between said ring gear and said housing.

4. A belt drive continuously-variable speed automatic transmission for a motor vehicle as claimed in claim 1, 2, or 3, wherein said reduction gear means includes a sun gear fixed to said output shaft, a ring gear fixed to said housing concentrically with said sun gear, at least one planetary pinion engaging with said sun gear and said ring gear and a planetary carrier carrying rotatably said at least one planetary pinion and being fixed to said first sprocket wheel.

5. A belt drive continuously-variable speed automatic transmission for a motor vehicle as claimed in claim 1 wherein one end of said output shaft is supported on a supporting member, the supporting member being positioned between said secondary variable-pitch pulley and said reduction gear means and fixedly supported on said housing, the other end of said output shaft is supported directly on said housing, and said first sprocket wheel is rotatably mounted on the outer periphery of said supporting member.

6. A belt drive continuously-variable speed automatic transmission for motor vehicle as claimed in claim 5, wherein said one end of the output shaft is projected from said supporting member toward the side of said fluid coupling with respect to said supporting member, said reduction gear means is provided on said projected end of said output shaft, and the output end of said reduction gear means is connected to said first sprocket wheel.

* * * * *